United States Patent [19]

Fleitas

[11] 4,369,868
[45] Jan. 25, 1983

[54] AUTOMATIC CLUTCH FOR FOUR-WHEEL DRIVE VEHICLES

[75] Inventor: Arthur M. Fleitas, Loveland, Colo.

[73] Assignee: Dualmatic Manufacturing Company, Longmont, Colo.

[21] Appl. No.: 180,699

[22] Filed: Aug. 25, 1980

[51] Int. Cl.³ .............................................. F16D 13/04
[52] U.S. Cl. ....................................... 192/36; 192/54; 192/93 A
[58] Field of Search .................... 192/35, 36, 54, 93 A, 192/67 R, 31; 180/247

[56] References Cited

U.S. PATENT DOCUMENTS

| | | | |
|---|---|---|---|
| 3,217,847 | 11/1965 | Petrak | 192/31 |
| 4,227,599 | 10/1980 | Ishiwata et al. | 192/54 |
| 4,238,014 | 12/1980 | Petrak | 192/54 |
| 4,262,785 | 4/1981 | Anderson et al. | 192/54 |
| 4,269,294 | 5/1981 | Kelbel | 192/93 A |
| 4,287,972 | 9/1981 | Petrak | 192/93 A |

*Primary Examiner*—George H. Krizmanich
*Attorney, Agent, or Firm*—Edwin L. Spangler, Jr.

[57] ABSTRACT

The disclosure relates to an automatic four-wheel drive clutch characterized by a sliding gear subassembly having a toothed ring, a cam ring with concave toothed cans opposing the latter, and springs biasing them apart. The toothed ring is movable along the axle into meshed engagement with an opposed ring of teeth carried by a driven element that turns with the front steerable wheel. A first biasing element normally urges the sliding gear subassembly into disengaged position while a subassembly including a set of toothed rollers mounted for rotation within an annular gap left between a pair of concentric sleeve bearings mesh with a ring of teeth on a thrust plate defining a circular track for the rollers to run around while traveling along the cams. A brake element in frictional contact with thrust plate and a second biasing means urging the brake element against the thrust plate cooperate when the axle turns to prevent rotation of the thrust plate thus forcing the rollers to climb the cams and extend the sliding gear subassembly into engaged position. The second biasing means also functions with the axle turning and the cams at the end of their cam surfaces to permit the elements so interengaged to turn as a unit with the wheel while sliding over the friction elements. The second biasing element further functions with the axle disengaged to cooperate with the first biasing means to hold the thrust plate stationary while the wheel is rotated in the direction opposite that in which the axle last turned while engaged thus turning the bearing assembly and driving the rollers into the bottom of the cams where the first biasing means becomes effective to retract and disengage the sliding gear subassembly.

10 Claims, 4 Drawing Figures

AUTOMATIC CLUTCH FOR FOUR-WHEEL DRIVE VEHICLES

The so-called "four-wheel drive hub" or, more properly, "clutch", has been around for many years and it serves the valuable function of disconnecting the front wheel drive train from the steerable front wheels so that this drive train will cease all movement when the front wheels turn even though the operative connection to the engine of the vehicle has been disengaged. The early clutches for this purpose were all manually actuated, usually to both engage and disengage them. Many such clutches are still in use and, as a matter of fact, they probably still out number the automatic ones.

The next generation of these clutches were the automatic ones that engaged under certain severe or "off-road" conditions usually evidenced by some sort of slippage where the four-wheel mode becomes necessary while, at the same time, remaining disengaged during normal highway driving and the like. The latest generation, on the other hand, are the fully automatic clutches which, while retaining the capability of being disengaged, remain engaged at all other times regardless of whether the vehicle is moving in forward or reverse. Noteworthy among the prior art four-wheel drive clutches of the latter type are those shown in the U.S. Patents to Petrak U.S. Pat. Nos. 3,217,847; Ainsworth 3,472,349; Goble 3,656,598; Kagata 3,765,521; and Preuter 3,788,435. Of the foregoing, while Preuter employs an axially spring-loaded brake shoe similar in some respects to that of the instant invention, his locking action is quite different in that he radially wedges a ring of rollers against a driven element by rolling them up ramps defined on the exterior surface of a polygonal actuating member. By way of contrast, locking action of applicant's clutch is axial. While Petrak's clutch engages axially as does that of the one described herein, his engagement is accomplished by the insertion of radially-projecting pins into axially-opening slots. Goble also employs relative axial movement to engage and disengage the teeth of this drive coupling; however, his mechanism for moving his interlocking elements into and out of engagement with one another is not at all like that of the clutch forming the subject matter thereof. The remaining clutches of Ainsworth and Kagata operate upon principles totally different from that of the instant one.

The automatic four-wheel drive clutch invented by applicant has the advantage of being quite simple yet positive and dependable in its action. With the vehicle in four-wheel drive mode, the clutch is, for all practical purposes, always engaged, the only exception being a brief interval when the direction of vehicle motion is reversed and even this lasts only about a third of a revolution of the wheel while a triad of toothed rollers run down one set of cam-forming ramps and back up another set. The unique feature of the clutch lies in the use of friction to retard the rotaton of the assembly in which the rings are housed thus causing them to roll along the toothed cams and toothed back-up plate to extend a tooth-carrying drive element axially into locked engagement with a similarly toothed driven element despite the bias of a spring urging the former element into disengaged position. Once engaged, the interlocked elements carry the roller subassembly with them and cause it to slip with respect to a spring-biased member pressing against the toothed back-up plate.

While the unit is intended for fully automatic operation, it can be made with a manual override feature which will disable the automatic feature and leave the clutch either engaged or disengaged depending upon the wishes of the user.

It is, therefore, the principal object of the present invention to provide a novel and improved fully automatic four-wheel drive clutch.

A second objective is the provision of a unit of the class described which can be made to include a manual override feature.

Another object of the invention herein disclosed and claimed is to provide a selective drive clutch which utilizes the drag of a rotating member against friction surfaces to effect engagement and disengagement of the drive coupling.

An additional objective of the within described invention is the provision of an automatic clutch which is purely axial in its operation.

Further objects are to provide a four-wheel drive clutch that is versatile, dependable, compact, lightweight, simple, fast-acting, rugged and even somewhat decorative.

Other objects will be in part apparent and in part pointed out specifically hereinafter in connection with the description of the drawings that follows, and in which.

Figure 2:
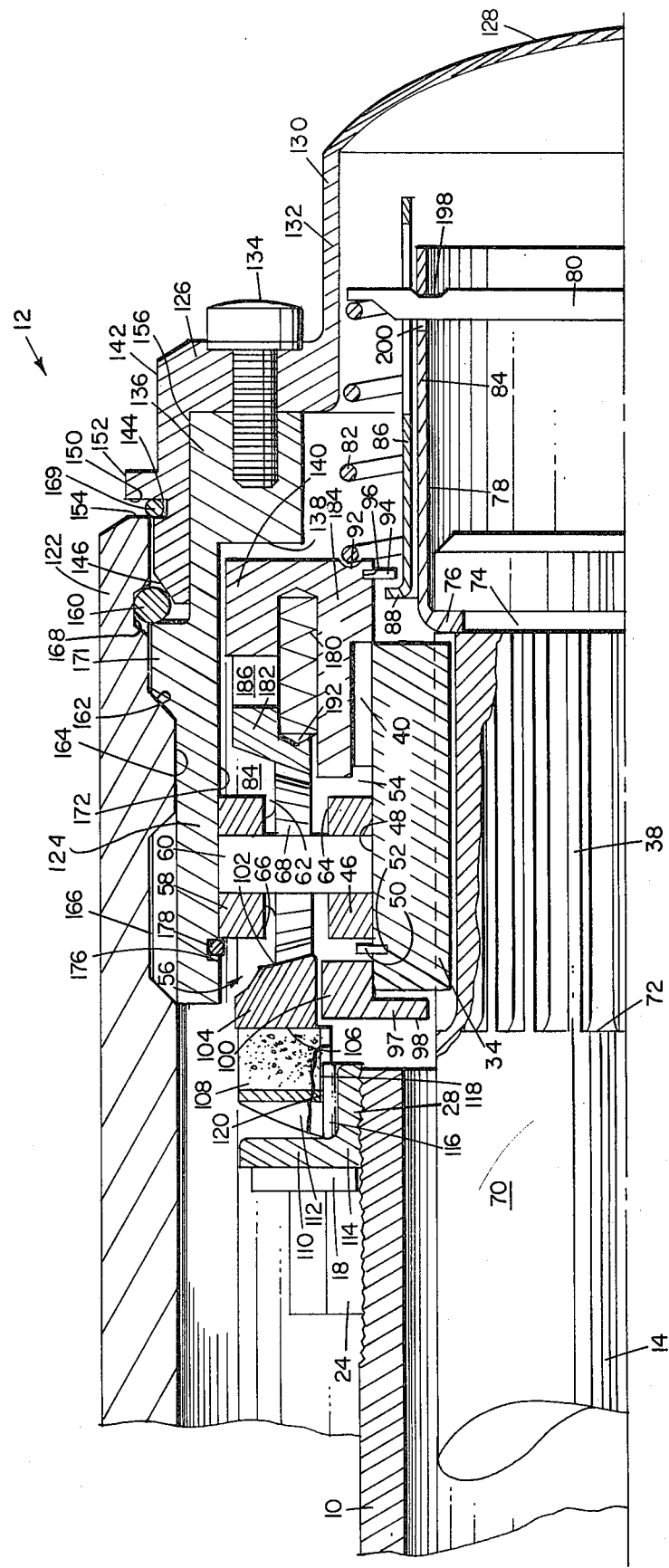
FIG. 2 is a quarter section showing the clutch in fully automatic mode preparatory to engagement, again having portions thereof broken away to more clearly reveal the interior construction.
Figure 3:
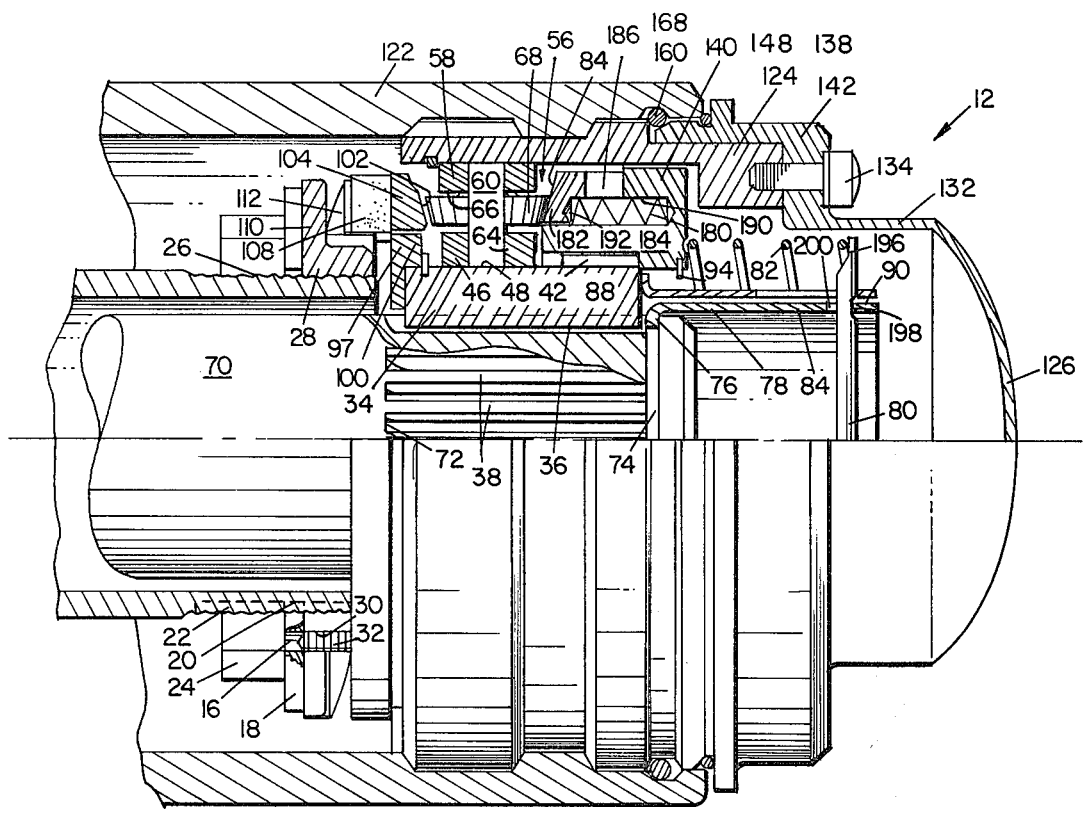
Figure 4:
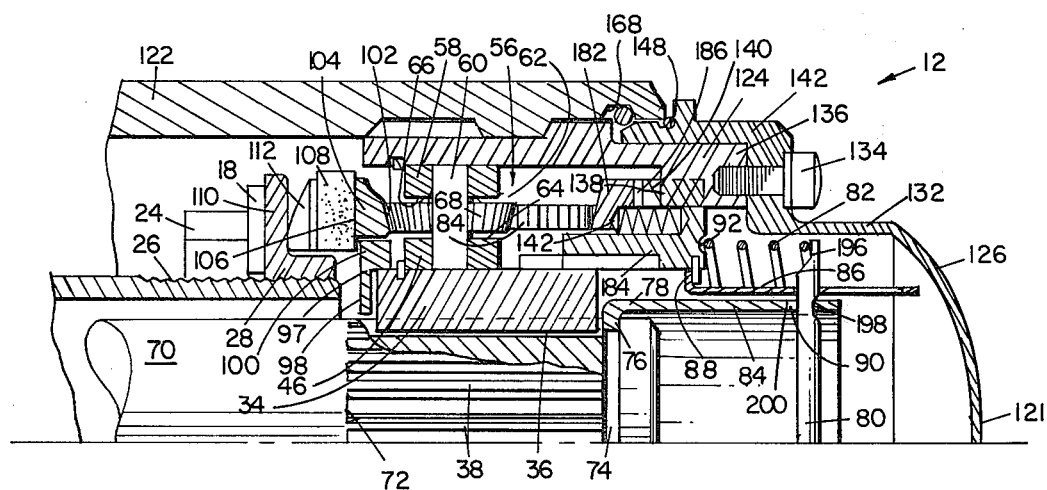

FIG. 3 is a view half in section and half in elevation to approximately half the scale of FIG. 2 showing the clutch manually actuated into disengaged condition, portions having been broken away to more clearly reveal the interior construction; and FIG. 4 is a quarter section similar to FIG. 3 and to the same scale but differing therefrom in that the clutch is shown in manually engaged condition, once again having portions thereof broken away to more clearly reveal the interior construction.

Figure 1:
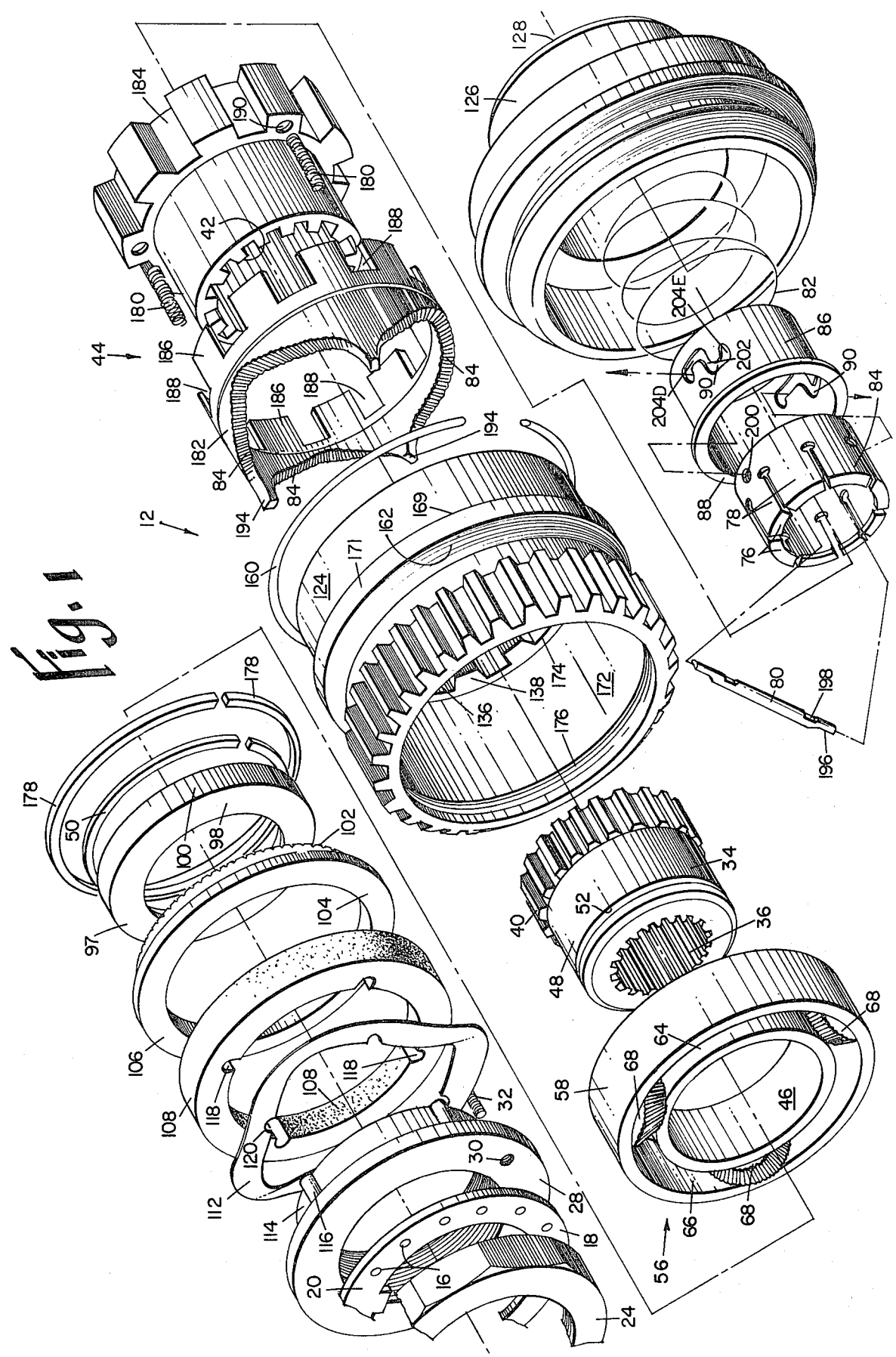
FIG. 1 is an exploded perspective view of the selective drive clutch and certain elements of the wheel associated therewith used on the Jeep Wagoneer and Bronco, portions having been broken away to more clearly reveal the interior construction.

Referring next to the drawings for a detailed description of the present invention and, initially, to FIGS. 1 and 2 for this purpose, reference numeral 10 identifies the hollow externally-threaded wheel spindle that mounts a wheel (not shown) for relative rotational movement in the conventional manner. Housed inside spindle 10 is the front axle 14 which carries external splines. Axle 14, the wheel and spindle 10 pivot as a unit thus providing a steerable front wheel assembly.

Axle 14 in a four-wheel drive vehicle can be connected and disconnected at will from the power train (not shown). The four-wheel drive clutch forming the subject matter of the instant invention and which has been broadly identified by reference numeral 12 defines a driving coupling between the front steerable wheel and axle 14 in a manner that will be set forth shortly. Before doing so, however, mention should, perhaps, be made of the fact that the instant clutch engages and disengages automatically which functions form the subject matter of FIG. 2. In addition, automatic features of the clutch can be manually overridden thus enabling same to be locked in its inoperative or disengaged position (FIG. 3) or, alternatively, in engaged position (FIG. 4). The manual feature of FIGS. 3 and 4 is not essential to the operation of the clutch which will function quite satisfactorily in automatic mode with or without the manual feature. With this in mind, the components of the clutch and how they interact in the automatic mode will first be described in connection with FIGS. 1 and 2 as has already been mentioned.

An apertured washer 18 has an integral key 20 that fits into an axially-extending keyway 22 (FIG. 3) in the spindle. Nut 24 threads onto the threaded exterior 26 of this spindle. Washer 18 lies outside of nut 24 and remains stationary with respect to the spindle. A flanged nut 28 threads onto spindle and screws up against washer 18. This flanged nut has a threaded hole 30 in it to receive pointed set screw 32. This set screw threads into one of the apertures 16 in the periphery of washer 18 and keeps the flanged nut from turning; therefore, elements 10, 18, 24 and 28 do not turn but remain fixed relative to one another.

Mounted on axle 14 for rotation therewith is an externally and internally splined sleeve 34. The internal splines 36 mate with the external splines 38 on the end of the axle while the external splines 40 on the sleeve mate with the internal splines 42 on cam-carrying sliding gear subassembly 44. Elements 34 and 44 cooperate to define the axially-movable interlocking element of the clutch. An inner bearing 46 fits on the cylindrical section of reduced diameter 48 of splined sleeve 34 and is held there by stop-forming snap ring 50 seated in annular groove 52 so as to hold the bearing against inwardly-facing shoulder 54. Splined sleeve 34, therefore, turns with the axle as does drive or sliding gear subassembly 44. Inner bearing 46, on the other hand, is free to turn relative to the axle, splined sleeve and sliding gear subassembly.

Inner bearing 46 forms a part of a drive roller subassembly 56 that includes an outer bearing 58, three radially-extending pins 60 spaced 120° apart angularly and bridging the annular gap 62 between the opposed surfaces 64 and 66 of the inner and outer bearings, and three externally-toothed rollers 68 mounted for rotation on the pins.

Splined sleeve 34 abuts the cylindrical section 70 of the axle inboard of the splines which define a series of outwardly-facing shoulders 72. The outer end of the axle is peripherally-grooved at 74 to receive the inturned teeth 76 on the free ends of spring fingers 78 which project inwardly from a pin-type spring abutment 80. With teeth 76 engaged within groove 74, pin 80 provides an abutment for the outer end of compression spring 82, the latter being used to bias the concave cam surfaces 84 of the sliding gear subassembly 44 into meshed engagement with the toothed rollers 68.

Encircling the spring fingers 78 of finger-carrying element 84 is a collar 86 having a peripheral flange 88 bordering its inside margin to form an annular abutment for manually disengaging the clutch in a manner to be explained presently. This collar also includes a diametrically-opposed pair of reverse S-shaped pin-receiving slots 90 that function to releasably latch collar 86 in the retracted position of FIG. 3 or the extended one of FIG. 4. A retaining ring 94 (FIGS. 2, 3 and 4) snaps into internal annular groove 96 on the outer end of the sliding gear subassembly. This retaining ring 94 defines an annular stop-forming abutment outside of the marginal flange 88 of collar 86 which is used in a manner soon to be described for the purpose of latching the sliding gear subassembly in engaged position. The inner end of spring 82 seats in groove 92 in the outer end of subassembly 44 which defines the inner abutment therefor.

Abutting the inner end of splined sleeve 34 is a washer 97 having a radially-extending inner flange 98 and a cylindrical outer flange 100. Inner flange 98 abuts the inner end of splined sleeve 34 while the outer flange 100 thereof defines the means for retracting and thus disengaging the toothed surface 102 of thrust plate 104 from meshed operative engagement with the teeth of toothed rollers 68 in the following manner. Backing up thrust plate 104 and in sliding frictional engagement with the inside surface 106 thereof is a friction lining 108. Between the radial flange 110 bordering flanged nut 28 is interposed a wave washer 112 which functions to normally bias the teeth 102 of thrust plate 104 into meshed engagement with rollers 68 thus also biasing the drive roller subassembly 56, of which the latter forms part, axially outward into meshed engagement with the tooth-carrying concave arm surfaces 84 of the sliding gear subassembly 44. The internally-threaded flange 114 of nut 28 has its outer cylindrical surface provided with one or more axially-extending ribs 116 which define keys that interengage with corresponding axially-directed slots 118 that function as keyways in the friction member 108. Notches 120 in the wave washer receive these same ribs 116 as they pass through into the slots in the friction member. With flanged nut 28 locked against rotation by set screw 32, its ribs 116 cooperate with the slots 118 and notches 120 to prevent both the wave washer and friction member 108 from turning, it being essential that the latter element not turn.

With brief reference to FIG. 3, it can be seen that with the hubcap 126 removed exposing sleeve 86, the latter can be manually pushed inward axially into the retracted position shown, whereupon flanged end 88 will engage the outer end of sleeve 34 which is left with a 1/16th of an inch or so of end play on the splines 38 of the axle 14. As sleeve 34 moves inwardly, its inner end engages flange 98 of washer 97 and pushes its cylindrical flange 100 against the outwardly-facing surface of friction element 108 thus backing the latter away from the ring 104 as it overcomes the bias of the wave washer 112. With the teeth 102 of element 104 thus free to disengage from toothed rollers 68, the drive coupling will be broken that is soon to be described resulting in manual disengagement of the clutch.

With specific reference to FIG. 2, it can be seen that the vehicle hub 122 that depends from the front wheel drive flange (not shown) houses the driven interlocking element 124 of the automatic clutch 12 forming the subject matter hereof which is locked in place in the particular embodiment illustrated by hub cap 126. The cup-shaped center part 128 of this cap covers and houses the manual actuating mechanism for disengaging and engaging the automatic hub and latching same in either position that has yet to be described. Bordering this central cup-shaped portion is an integrally-formed radial flange 132 which detachably fastens to the driven element 124 by means of a series of angularly-spaced cap screws 134 which thread into tooth-carrying flange 136 bordering the latter on its outer end. The inwardly-facing portion of toothed flange 136 carries the teeth 138 that mesh in engaged position with the teeth 140 on the opposed outwardly-facing surface of the sliding gear subassembly. Encircling this radial flange of the hub cap is an integrally-formed annulus 142, the outer surface of which is peripherally ribbed and beveled to define an O-ring seat 144 and an inclined annular cam surface 146 adjacent the latter but on the inside thereof. O-ring groove 144 houses an O-ring 148 which abuts the inwardly-facing annular shoulder 150 of circumferential rib 152 carried by annulus 142 and the outer end 154 of hub 122 to define an annular seal effective to keep out dirt, moisture and other foreign material.

Except for circumferential rib 152, annulus 142 is sized to telescope into the wheel hub 122 over the cylindrical outer end 156 of the driven element. The inside cylindrical portion of the wheel hub is annularly-grooved at 158 to receive split retaining ring 160. The inwardly-sloping annular incline 146 on the inner marginal edge of the hub cap slides in under the retaining ring 160 and holds it expanded within groove 158 when the flange 132 of the hub cap is drawn up snug against the face of the driven element by cap screws 134.

In the particular embodiment shown in FIGS. 2, 3 and 4 which is representative of the front steerable wheel assemblies found on the Chevrolet "Blazer", Ford "Bronco" and Jeep "Wagoneer", the hubs 122 are internally-splined out to a point spaced inside the end 154 thereof. An annular stop-forming shoulder 162 that encircles the driven element 124 and engages the outer end of hub splines 164 to limit the inward excursion of the driven element 124. Wheel hub splines 164 cooperate when interengaged with an integrally-formed ring of splines 166 spaced inwardly of stop-forming shoulder 162 to prevent relative rotational movement between the driven element and front vehicle wheel. Ring 160 when expanded into groove 168 and in abutting relation to outwardly-facing shoulder 169 of rib 171 keeps the hub cap and driven element 124 bolted thereto from backing out.

The inner end of driven element 24 contains a cylindrical section 172 of increased diameter bordered on its outer end by an annular shoulder 174 and containing an annular groove 176 adjacent its inner end. This cylindrical section 172 opposes section 48 of the splined sleeve and the two cooperate to define the races over which the inner and outer bearings 46 and 58, respectively, slide. On the inside of outer bearing 58 is a snap ring 178 seated within groove 176 which prevents the roller subassembly 56 from migrating axially inward to a point where it can re-engage the teeth 102 of thrust washer 104 when manually disengaged as shown in FIG. 3.

Sliding gear subassembly 44 is a key element in the entire assembly since it defines the operative link that interconnects splined sleeve 34 and driven element 124. In the particular form shown, this subassembly includes a plurality of compression springs 180 interposed between elements 182 and 184 so as to normally bias them into an axially-extended relation. The opposed surfaces of elements 182 and 184 carry teeth 186 and 140, respectively, that interengage and prevent relative rotational movement therebetween. Teeth 186 extend axially inward and are defined by notches 188 in the outwardly-facing edge of element 182 which is tubular in shape. Teeth 140, on the other hand, are the same teeth that mate with teeth 138 of driven element 124 and cooperate therewith in engaged position to form the driving connection. Sockets 190 in certain of the teeth 140 house the outer ends of the springs while the inner ends thereof are similarly seated in pockets 192 (FIG. 2) in the bottom of selected notches 188. The fully extended positions of the sliding gear subassembly is that shown in FIG. 2 where the rollers 68 are seated at the low point of cams 24 and the teeth 140 of locking element 184 are disengaged. In such condition, teeth 186 and 140 of the sliding gear subassembly remain interengaged.

Directing the attention next to FIG. 2 and starting first with the automatic operation of the clutch and more specifically, in forward mode, the operator need only place the four-wheel drive shift lever of the vehicle (not shown) in gear which, of course, has the effect of starting axle 14 turning. As it does so, splined sleeve 34 will rotate therewith along with sliding gear subassembly 44 which is splined to the latter. At this point, however, the drive or sliding gear subassembly 44 is retracted under the influence of compression spring 82 such that its teeth 140 are no longer in meshed driving engagement with the teeth 138 of driven element 124. It is this position which is represented in FIG. 2. The tooth-carrying cam surfaces 84, however, remain meshed with the teeth on rollers 68. Now, as the axle begins to rotate the sliding gear subassembly 444, rollers 68 will begin to roll from the low point of cam surfaces 84 and ascend one of its oppositely-inclined ramps to the top thereof thus causing the cam-carrying element 182 to extend and move away from plate 104 against the bias exerted thereon by springs 180 until the teeth 140 of companion element 186 seat in the bottom of notches 188; whereupon, the elements 182 and 186 of the sliding gear subassembly 44 will continue to move outward axially as a unit overcoming the bias exerted thereon by spring 82 until teeth 140 engage and from a driving connection with teeth 138 of driven element 124. Rotation of the sliding gear subassembly causes the roller subassembly 56 to turn in the same direction but at half the speed as the rollers 68 roll along the toothed face 102 of the thrust plate 104 which is held essentially stationary by the thrust of wave washer 112 biasing the friction lining 108 thereagainst. After about a third of a turn or less of the axle 14 relative to the wheel spindle 10, the sliding gear subassembly 44 will have moved axially out into its extended engaged position with driven element 124 thus establishing a driving connection between the axle 14 and the wheel mounted on hub 120. Between each of the three cam surfaces 84 carried by sliding gear 44 is a stop 194 (FIG. 1) which functions upon being impinged against by the toothed rollers 68 to prevent any further relative rotational movement between the sliding gear subassembly 44 and roller subassembly 56. When this happens, thrust plate 104 begins to rotate with the roller subassembly, sliding gear subassembly, driving gear and wheel as a unit while sliding over the friction lining that remains stationary due to its being keyed against rotation to the keys 116 of flanged washer 28. This condition continues as long as the vehicle is driven forward in four-wheel drive mode.

Shifting from forward to reverse while still in four-wheel drive mode unexpectedly results in no disengagement of the clutch which is a distinct advantage in rocking the vehicle back and forth. During sustained operation of the vehicle in a reverse direction, on the other hand, disengagement and re-engagement does, in fact, take place. More specifically, with sliding gear subassembly 44 axially extended by roller subassembly 56 as above noted, when axle 14 begins rotating this sliding gear subassembly in the opposite direction, toothed rollers 68 will commence backing away from the stops 194 and roll down to the bottom of the cam surfaces again. As this happens, the friction lining 108, wave washer 112 and washer 28 will be cooperating to prevent rotation of the roller subassembly, pressure plate 104 and sliding gear subassembly 44 as a unit. If this were not the case and the three moved together, the clutch would not disengage. In other words, there must be relative motion between teeth 102 of the pressure plate 104 and the teeth of cam 84 or the rollers 68 cannot turn thus the thrust plate must be held against rotation by the friction lining. At the same time, compression spring 82 is functioning to bias the sliding gear subassembly inward axially into disengaged position. This disengaged condition, however, is a momentary one because just as soon as the rollers 68 reach the bottom of the concave cam surfaces, they immediately begin to ascend the other of its ramps thus, once again, forcing the sliding gear subassembly axially outward into engaged position overcoming the bias of the compression spring; whereupon, the rollers contact the set of stops 194 on the opposite sides thereof and start the thrust plate rotating in sliding contact with the friction lining but in the reverse direction. This condition subsists so long as the vehicle is moving in reverse and it continues to be operated in four-wheel drive mode.

One significant aspect of the automatic operation of the hub has yet to be mentioned and that is the significance of the frictional contact of the inner bearing of the roller subassembly 56 with the cylindrical section 48 of splined sleeve 34 and the like frictional contact that exists between outer bearing 58 and cylindrical section 172 of the driven element. These cylindrical friction surfaces cooperate with one another to cause the roller subassembly 56 to turn with the wheel and relative to the thrust plate which is being held against rotation thus rolling the rollers down the ramps when the axle is disengaged and the wheel is being turned in a direction opposite to that in which the axle last turned while engaged.

Next, it will be explained how the clutch automatically disengages when the vehicle is taken out of four-wheel drive mode and it is moved in a direction opposite to that in which it has been traveling a distance such as to cause the wheels to turn perhaps a third of a revolution. By disengaging the four-wheel drive, axle 14 no longer rotates nor, of course, do splined sleeve 34 or sliding gear subassembly 44 which are still interengaged. On the other hand, as the vehicle is moved in a direction opposite to that in which it had been going, driven element 124, sliding gear subassembly 44 meshed therewith, splined sleeve 34 and axle 14 will all rotate as a unit relative to the spindle 10, wave washer 112, friction lining 108 and thrust plate 104 which remain stationary thus causing the rollers 68 to rotate in a direction to drive them away from stops 194 and down to the bottom of the cams 84 while compression spring 82 is biasing the sliding gear inwardly in an axial direction toward its disengaged position. Once the meshed teeth 140 of the gear become disengaged from teeth 138 of the driven element 124, axle 14, splined sleeve 34, sliding gear subassembly 44, roller subassembly 56 and thrust plate 104 all cease to turn thus restoring the vehicle to the two-wheel drive mode where it remains regardless of whether it is driven in forward or reverse until it is, once again, placed in four-wheel drive mode.

An auxiliary, but nonetheless significant, feature of the instant automatic clutch is that which permits it to be manually engaged and disengaged. This manual feature can be omitted from the clutch without affecting its automatic operation. With specific reference to FIGS. 3 and 4 it can be seen that both the manual engagement and disengagement functions are carried out by means of the peripheral flange 88 bordering collar 86 on its inner end. The manual disengagement function illustrated in FIG. 3 has already been described in detail with the exception of how it is releasably latched in such condition. Pin 80 which extends diametrically across finger-carrying element 84 has the flattened extremeties 196 thereof seated behind spring 82 so as to define the outer abutment therefor. Pin 80 is also notched at 198 to receive the edges bordering diametrically opposed apertures 200 in element 84 which cooperate to keep the pin from dropping out when biased axially outward by spring 82.

As collar 86 is manually moved inwardly as in FIG. 3 but with the hubcap removed, pin 80 rides within the axially-directed section 202 of notch 90 until it reaches the fully-retracted position necessary to disengage the thrust plate 104 from the rollers 68 of the ring subassembly; whereupon, it is rotated to seat and lock the pin in laterally-extending section 204D thereof. In like manner, collar 86 is releasably latched in engaged position by pulling same outward and rotating it in the opposite direction to seat pin in section 204E thereof, all of which is most clearly seen in FIG. 1. FIG. 2, of course, shows the sleeve 86 in its neutral or inoperative position where pin 80 rides in the axially-directed portions 202 of reverse S-shaped slots 90 and thus "floats" between abutments 34 and 94 leaving the clutch 12 free for fully automatic operation.

In FIG. 4 to which detailed reference will next be made, the manual override function of engaging the clutch has been shown. Here, collar 86 is extended and its marginal flange 88 contacts ring 94 on the inside of the sliding gear element 184 causing the latter to extend into locked driving engagement with driven element 124. As sliding gear subassembly 44 assumes its extended interengaged condition, it overcomes the bias of spring 82.

What is claimed is:

1. A selective drive clutch for automatically connecting a driven element to a drive element for conjoint coaxial rotation and for automatically disconnecting same when said drive element is not being driven, comprising: a first interlocking member mountable upon the driven member for rotational movement therewith; a second interlocking member mountable upon the drive element for rotational movement therewith and for axial movement relative thereto between retracted and extended positions; means carried by opposed end portions of said first and second interlocking members effective upon extension of the latter to interengage and effect a driving connection therebetween; first biasing means operatively associated with said second interlocking member normally biasing same into retracted position; and actuating means responsive to limited relative rotational movement between said drive and driven elements for effecting an axial shift of said second interlocking member between its extended and retracted positions, said means including a pair of tooth-carrying elements mounted in axially-spaced face-to-face relation, said elements each having arcuately-curved rows of teeth arranged in opposed relation, the first of said pair of tooth-carrying elements being movable both axially and rotarially with said second interlocking member on the end thereof remote from said first interlocking member, the second of said pair of tooth-carrying elements being mounted for independent rotation relative to said first tooth-carrying member in coaxial relation thereto, one of said curved rows of teeth defining a track encircling the axis of rotation in perpendicular relation thereto, the other of said curved rows of teeth defining at least one concave cam surface having stops at the remote ends thereof and a pair of oppositely-inclined ramps arranged in end-to-end relation therebetween; said actuating means also including a cam follower subassembly located between said first and second tooth-carrying elements, said subassembly having a toothed roller operatively interconnecting the teeth of each cam surface with the teeth of the track opposite thereto so as to define a driving connection therebetween, and roller support means frictionally associated with at least one of said first and second interlocking members for rotational movement therewith when interlocked; and said actuating means further including braking means having a fixed friction surface engaging said second tooth-carrying element operative to yieldably retard rotation thereof, said actuating means being operative in reponse to relative rotation of said drive element in either direction relative to said driven element to overcome the bias exerted upon the second interlocking element by said first biasing means and cause said toothed roller to ascend one of the ramps thereby extending said second interlocking element into interlocked driving engagement with said first interlocking member while said second tooth-carrying element is being held against rotation by the braking means thereof, said actuating means also being operative upon continued rotation of said interlocked first and second interlocking members in the same direction to drive said toothed roller against the stop at the end of said ascended ramp thus preventing further relative rotational movement between said first and second tooth-carrying elements and causing the latter to overcome the frictional contact between it and the braking means thereby causing it to slip relative thereto, said actuating means being further operative in cooperation with said biasing means in response to reversal of said drive element with the first and second interlocking elements interlocked to cause said toothed roller to descend said ascended ramp and ascend the other thus momentarily retracting said second interlocking member before again extending and reconnecting same to said first interlocking member for continued driving engagement in said reverse direction, and said actuating means being still further operative in cooperation with said biasing means in response to deactivation of said drive element into a free-wheeling condition and rotation of said driven element relative thereto in a direction opposite to that in which said drive element was last driven while said braking means remains effective to prevent rotation of said second tooth-carrying means to rotate said interlocked first and second interlocking elements as a unit relative to said cam follower subassembly so as to cause the toothed roller thereof to descend the ramp it has ascended thereby allowing said biasing means to bias said second interlocking member into retracted position and releasing the driving connection between it and said first interlocking member.

2. The selective drive clutch as set forth in claim 1 wherein the toothed cam and stops are carried by the first of said tooth-carrying elements.

3. The selective drive clutch as set forth in claim 1 wherein the braking means is mounted for limited axial movement; and, wherein said actuating means also includes a second biasing means opposing said first biasing means and engaging said braking means so as to normally bias the latter against the second tooth-carrying means.

4. The selective drive clutch as set forth in claim 1 wherein the first tooth-carrying element has at least two toothed cams arranged in equiangularly-spaced relation therearound.

5. The selective drive clutch as set forth in claim 1 which includes manual engagement means rotatable with the axle and movable axially thereof relative to the second interlocking member between a retracted inoperative position and an extended operative one effective to engage and extend same into driving engagement with the first interlocking member in opposition to the bias of said first biasing means.

6. The selective drive clutch as set forth in claim 1 wherein the first of said tooth-carrying element and second interlocking member carrying means on opposed surfaces thereof interlocking same for conjoint rotational movement and relative axial movement between a retracted and an extended position; and, wherein third biasing means are interposed between said first tooth-carrying element and said second interlocking member normally biasing them into extended position.

7. The selective drive clutch as set forth in claim 3 which includes manual disengagement means rotatable with the axle and movable axially thereof relative to said second tooth-carrying element between an extended inoperative position and a retracted operative one effective to engage and retract the latter to a position where the teeth thereof no longer mesh with the roller teeth in opposition to the bias of said second biasing means.

8. The selective drive clutch as set forth in claim 5 wherein said manual engagement means includes locking means operative upon actuation to releasably latch same in extended position.

9. The selective drive clutch as set forth in claim 6 wherein the means interlocking said first tooth-carrying element and second interlocking means together for conjoint rotation comprise opposed toothed surfaces.

10. The selective drive clutch as set forth in claim 7 wherein said manual engagement means includes locking means operative upon actuation to releasably latch same in retracted position.

* * * * *